United States Patent Office 2,999,818
Patented Sept. 12, 1961

2,999,818
PHOSPHORS AND METHODS FOR PRODUCING SAME
George H. Morrison, Westbury, Frank C. Palilla, Maspeth, and Walter Zloczower, Forest Hills, N.Y., assignors to Sylvania Electric Products Inc., a corporation of Delaware
No Drawing. Filed Nov. 16, 1959, Ser. No. 852,958
4 Claims. (Cl. 252—301.6)

Our invention relates to electroluminescent phosphors and processes for making the same.

The color of the light emitted from an energized electroluminescent lamp depends primarily upon the characteristics of the electroluminescent phosphor utilized therein. Known electroluminescent phosphors can produce blue, green or orange-yellow light emission.

In many lighting applications it is most desirable to produce white colored electroluminescent emission. A known technique for producing white emission is to mix together, in suitable proportions, a blue emitting electroluminescent phosphor and a yellow emitting electroluminescent phosphor. This mixture, when electrically excited, yields predominantly blue and yellow emission, the relative intensities of blue and yellow being so adjusted that a composite white light results.

In contradistinction, we have invented a new electroluminescent phosphor which, without admixture with other phosphors, is capable of emitting white light, and further, have invented a new process for producing this phosphor. Moreover, by varying certain parameters during processing, the range of spectral electroluminescent emission of the phosphor to be produced can be varied from blue to green.

In accordance with the principles of our invention, anhydrous copper sulfate was added to a copper activated, chloride coactivated cathodoluminescent phosphor of the zinc sulfide type, the amount of copper added, as expressed as a percentage by weight of the phosphor, ranging betwen 0.05%–55%.

The resultant mixture was then fired at a temperature falling within the approximate range 700°–900° C., and then cooled and washed with an alkali cyanide solution to produce the desired electroluminescent phosphor.

When this electroluminescent phosphor was incorporated into an electroluminescent lamp, and an alternating voltage was applied thereto, it was found that the color of the emitted light was determined by the amount of copper added in the initial step of our process. When only a small amount of copper was added, blue light was produced. As the copper content was increased, the color changed progressively from blue to blue-white, to white, to green-white, to green. The color of the emitted light was found to be essentially independent of the frequency of the applied voltage.

The electroluminescent phosphor was also illuminated with ultra-violet radiation. When the phosphor contained only small amounts of copper, blue photoluminescence was observed. As the copper content of the phosphor was increased, the color of the photoluminescence changed progressively from blue to white, to yellow, to orange.

Surprisingly, analysis of the phosphors produced in the manner set forth above showed that the final copper content of the phosphors was always about .03%–.04% by weight of the phosphor, regardless of the amount of copper sulfate added in the initial step of our process. Apparently, only a certain proportion of the copper remains in the base material and the excess copper is washed away by the cyanide.

Illustrative embodiments of our invention will now be described in more detail in the examples which follow.

Example I 20 grams of a copper activated, chloride coactivated cathodoluminescent phosphor (designated commercially as a type P–2 phosphor) containing 95% by weight of zinc sulfide and 5% by weight of cadmium sulfide, were ball milled in a Spex mixer-mill for a period of 5 minutes. (The copper content of this phosphor ranged betwen .01%–.03% by weight of phosphor.) The ground phosphor was blended with 17.5 grams of anhydrous copper sulfate, the resultant blend being transferred to a covered quartz crucible. (This represents a copper addition of 35% by weight of the cathodoluminescent phosphor.)

The crucible was placed in a muffle furnace and fired at a temperature of 800° C. for 40 minutes. The crucible was then removed from the furnace and permitted to cool to room temperature.

The fired mixture was then removed from the crucible, washed first with 50 ml. of warm acetic acid (50% concentration) and, thereafter, washed successively with three separate 50 ml. portions of warm distilled water. Finally, the mixture was washed successively with individual 50-ml. portions of warm potassium cyanide (5% concentration), until the body color of the mixture (which became progressively lighter) did not change with additional washing. Thereafter, the material was washed with water, heated to dryness at a temperature of 130° C., and sieved through a 325 mesh screen.

The resultant product was found to have a heavy yellow body color and, when irradiated with ultraviolet light, exhibited white photoluminescence.

The product was also incorporated into a 5 mil gap, 1 inch x 1 inch demountable electroluminescence test cell using castor oil as a dielectric, with a loading of two parts by weight of phosphor to one part of castor oil. When an alternating voltage was applied to the cell, white electroluminescence ensued. At an applied voltage of 200 volts and at a frequency of 300 cycles per second, the efficiency was found to range between 2–3 lumens/watt. At an applied voltage of 600 volts and at a frequency of 6000 cycles per second, the brightness was found to be 75 foot lamberts. It was found that there was a slight color shift toward blue as the frequency of the alternating voltage was varied from 60 to 6000 cycles per second.

Example II

The process of Example I was repeated using a copper addition of 55% by weight of the sulfide and a firing temperature of 700° C. Green electroluminescence ensued. The photoluminescence was orange colored.

Example III

The process of Example I was repated using a copper addition of 0.05% by weight of the sulfide and a firing temperature of 900° C. Blue electroluminescence ensued. The photoluminescence was blue colored.

What is claimed is:

1. A process for producing an electroluminescent phosphor from a copper activated, chloride coactivated cathodoluminescent zinccadmium sulfide phosphor, said process comprising the steps of mixing said cathodoluminescent phosphor with copper sulfate, the amount of copper added, as expressed in a percentage by weight of the cathodoluminescent phosphor, falling within the range 35%–55%; firing said mixture to a temperature falling within the approximate range 700°–900° C.; and washing said fired mixture with an alkali cyanide solution to remove all excess copper therefrom, thus producing said electroluminescent phosphor.

2. A process for producing an electroluminescent phosphor from a copper activated, chloride coactivated cathodoluminescent zinc-cadmium sulfide phosphor, said process comprising the steps of mixing said cathodoluminescent phosphor with copper sulfate, the amount of copper added, as expressed in a percentage by weight of the cathodoluminescent phosphor, being about 35%; firing said mixture at a temperature falling within the approximate range 700°–900° C.; and washing said fired mixture with an alkali cyanide solution to remove all excess copper therefrom, thus producing a white emitting electroluminescent phosphor.

3. A process for producing an electroluminescent phosphor from a copper activated, chloride coactivated cathodoluminescent zinc-cadmium sulfide phosphor, said process comprising the steps of mixing said cathodoluminescent phosphor with copper sulfate, the amount of copper added, as expressed in a percentage by weight of the cathodoluminescent phosphor, being about 55%; firing said mixture at a temperature falling within the approximate range 700°–900° C.; and washing said fired mixture with an alkali cyanide solution to remove all excess copper therefrom, thus producing a green emitting electroluminescent phosphor.

4. An electroluminescent phosphor produced by mixing a copper activated, chloride coactivated cathodoluminescent zinc-cadmium sulfide phosphor with copper sulfate, the amount of copper added, as expressed in a percentage by weight of the cathodoluminescent phosphor, falling within the range 35%–55%; firing said mixture at a temperature falling within the approximate range 700°–900° C.; and washing said fired mixture with an alkali cyanide solution to remove all excess copper therefrom.

References Cited in the file of this patent
UNITED STATES PATENTS 2,821,509    Hunt et al. _____ Jan. 28, 1958